Sept. 19, 1967     S. R. OVSHINSKY     3,343,034
TRANSIENT SUPPRESSOR
Filed April 10, 1964     2 Sheets-Sheet 1
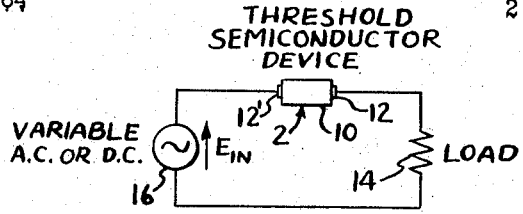
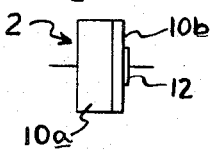
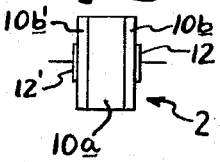
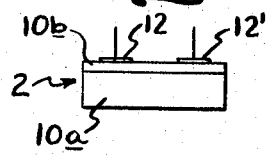
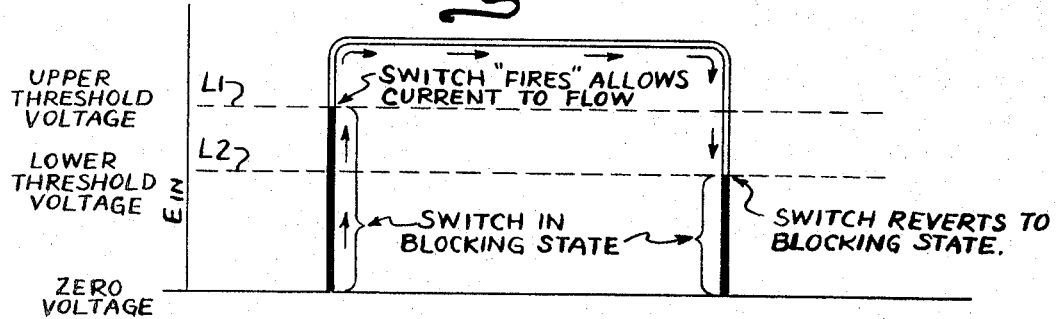
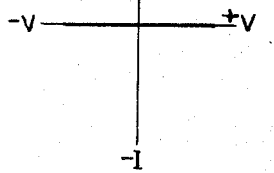
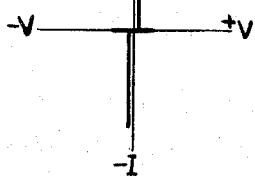
INVENTOR
STANFORD R. OVSHINSKY
by: Wallenstein, Spangenberg
    & Hattis
                ATTYS.

Sept. 19, 1967    S. R. OVSHINSKY    3,343,034
TRANSIENT SUPPRESSOR

Filed April 10, 1964    2 Sheets-Sheet 2

INVENTOR
STANFORD R. OVSHINSKY by: Wallenstein, Spangenberg
& Hattis    ATTYS.

United States Patent Office 3,343,034
Patented Sept. 19, 1967

3,343,034
TRANSIENT SUPPRESSOR
Stanford R. Ovshinsky, Birmingham, Mich., assignor, by mesne assignments, to Energy Conversion Devices, Inc., Troy, Mich., a corporation of Delaware
Filed Apr. 10, 1964, Ser. No. 358,855
The portion of the term of the patent subsequent to Sept. 6, 1983, has been disclaimed
5 Claims. (Cl. 317—11)

ABSTRACT OF THE DISCLOSURE

A transient suppressor for a load circuit having a bi-directional switching device like that disclosed and claimed in U.S. Patent No. 3,271,591 connected in parallel to the load for short circuiting excessive voltage conditions in the load circuit. The breakdown voltage of the switching device is greater than the normal voltage in the circuit and less than the excessive or unsafe voltage in the circuit, and upon breakdown, the voltage drop across the device becomes a minor fraction of the breakdown voltage of the device to dissipate substantially all of the transient current therethrough.

---

This application is a continuation-in-part of copending applications Ser. No. 118,642 filed June 21, 1961 and abandoned; Ser. No. 226,843 filed September 28, 1962 and forfeited; Ser. No. 252,510 filed January 18, 1963 and abandoned; Ser. No. 252,511 filed January 18, 1963 and forfeited; Ser. No. 252,467 filed January 18,1963 and abandoned; Ser. No. 288,241 filed June 17, 1963 and abandoned; and Ser. No. 310,407 filed September 20, 1963, now U.S. Patent No. 3,271,591, granted September 6, 1966.

This invention relates to a means for suppressing transients generated, for example, by the switching of inductive loads and by external electric fields which induce transients in power lines and the like. These transients are undesirable because they can cause sparking and hence wear of switch contacts used to control the coupling of a source of voltage to the load and can damage unprotected equipment in the circuit involved.

Various means have been used for suppressing these voltage transients in the past such as capacitors, resistors and capacitors in combination, silicon carbide varistors and selenium recitifiers. Selenium recitifiers have recently enjoyed increased usage as transient suppressors because they represent a significant improvement over earlier transient suppressor components.

Although selenium rectifiers are satisfactory for many applications, they are unsatisfactory in a number of respects. For example, the leakage of selenium rectifiers is excessive and they are bulky so that frequently they are larger than the devices being protected. Another disadvantage of selenium rectifiers is that the voltage-current characteristic thereof is relatively non-linear and the voltage drop thereacross varies substantially with current. In such a case, it is very difficult to modify the effective voltage-current characteristic of the suppressor circuit utilizing such rectifiers to optimize a particular circuit design.

It is accordingly, an object of the invention to provide a very simple and inexpensive means for suppressing voltage transients of any polarity and which overcomes some and preferably all of the disadvantages of selenium rectifiers referred to above.

A related object of the invention is to provide an improved transient suppression means for suppressing voltage transients of any polarity in a circuit by use of a single, two-terminal, bi-directional transient suppression device which when placed across the portion of the circuit where the transient appears, will prevent the build up of excessive transients of any polarity, and which transient suppression means is compact, inexpensive, has an exceedingly high leakage resistance when no transients are present, becomes a very low resistance when the device is fired and remains in the low resistance state until the current therethrough reduces substantially to zero.

It is a further object of the invention to provide an improved suppressor circuit for transient voltages where the effective voltage-current characteristic thereof is vertical or substantially linear and where the characteristic can be modified readily to optimize the circuit design.

In the short span of years since World War II, semiconductor technology has advanced at a phenomenal pace. Starting with the germanium rectifier and the point contact transistor, research and development laboratories have applied the theory of conduction by junction control to create a whole new family of solid state components (junction diodes and junction transistors, silicon controlled rectifiers and switches, tunnel diodes). Today, these and many other highly sophisticated semiconductor devices are being used in countless applications to accomplish functions at levels of speed, power and reliability undreamed of less than a decade ago.

It is interesting to note, however, that all of these remarkable solid state components are based essentially upon extensions and refinements of basic rectifier principles. That is, they allow current to flow in just one direction—and are therefore inherently suitable for use in direct current applications only. Accordingly, to apply present-day semiconductor components to the control of alternating current, it has been necessary to use two identical units "back-to-back" in conjunction with complex circuitry—or to resort to more complex rectifying devices such as five layer diodes, which are essentially back-to-back rectifiers in one package having limited application (e.g. control cannot readily be effected by signals at commercial power line frequencies) and which are relatively difficult and expensive to manufacture.

In view of these limiting factors, it has long been apparent that an entirely new theoretical concept would be required to extend the full advantages of semiconductors to the far broader field of alternating current control. It has also been apparent that any such concept must be predicated upon development of new and symmetrical semiconductor materials which would permit elimination of the rectifying junction and thus allow current to flow in both directions. Such a new development is disclosed in this application in the form of a bi-directional semiconductor device to be referred to as a threshold semiconductor device. (Such a device is referred to in said copending application Ser. No. 310,407 as a mechanism device.) The threshold semiconductor device has an important use as a transient suppressor device because it normally or initially presents a very high resistance (e.g. one to ten megohms and higher) under normal voltage conditions of any polarity below a given upper threshold level, a very low resistance (about one ohm or less) when a voltage transient of any polarity above said given upper threshold level is applied thereto, the change from the high to the low resistance condition occurring substantially instantaneously, and automatically resets itself substantially instantaneously to its high resistance state or condition when the current therethrough drops substantially to zero, so that further transients will not be developed thereby. When a transient voltage is applied thereto above the upper threshold level, which must be above the maximum value of the normal voltage appearing in the portions of the circuit involved, at least portions of the device are substantially instantaneously changed from a higher resistance or blocking condition to a low resistance condition and act as a conductor. When the transient voltage decreases below a value where the current flow through the device decreases to substantially zero, the said at least portions of the device substantially instantaneously change from a low resistance or conducting condition back to a high resistance or blocking condition.

The principal advantages of the use of the threshold semiconductor device as a transient suppressor are that the device can be manufactured at a very small cost; it is compact; it has an exceedingly high leakage resistance so that there is negligible power loss in the device; and, as will be explained later on in detail, the voltage-current characteristics of the device are such that the device can be operated in conjunction with a resistor which varies the effective overall voltage-current characteristic of the suppressor circuit so that the suppressor circuit can be optimized for a particular circuit design.

For a more complete understanding of the threshold semiconductor device and its application as a transient suppressor, reference should be made to the specification, the claims, and the drawings wherein:

FIG. 1 is a schematic representation of threshold semiconductor device described above in a circuit including a load and a source of voltage for controlling the load;

FIGS. 2, 2A and 2B illustrate a few exemplary physical forms of the threshold semiconductor device shown in FIG. 1;

FIG. 3 is a diagram illustrating the operation of the threshold semiconductor device in FIG. 1;

FIGS. 4 and 4A illustrate the voltage-current characteristics for the two operating states of the threshold semiconductor device of FIG. 1 in an A.C. load circuit;

Figure 5:
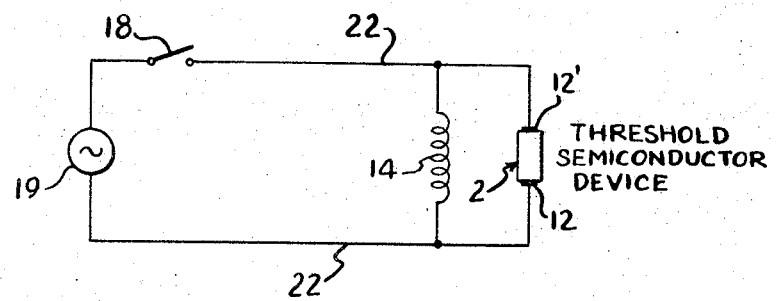
FIG. 5 illustrates the application of the threshold device in FIG. 1 as a transient suppressor for an inductive load.

For an understanding of the nature and manner of operation of the threshold semiconductor device, reference is first made to FIGS. 1 to 4A of the drawings. In FIG. 1, which illustrates a typical simple load circuit, the threshold semiconductor device 2 used in the present invention has a body 10 which may take a variety of forms and includes, as a surface film or as the entire body 10 or as a part thereof, an active bi-directional semiconductor material having very unique and advantageous properties to be described. The body 10 includes a pair of electrodes 12–12' electrically connecting the same with a load 14 and a source of voltage 16. In the generalized situation, the source of voltage 16 may be a source of alternating or direct current. In the present invention, the voltage source will constitute a source of transient voltage as, for example, a voltage developed in an inductive load (such as a relay coil or motor 14 in FIG. 5) when a source of applied voltage (e.g. element 19 in FIG. 5) is interrupted to the inductive load by the opening of a mechanical or electronic switch (element 18 in FIG. 5). In the present invention the source of voltage 16, for example, also may be a transient voltage induced by lightning in the power lines connecting the source of applied voltage 19 in FIG. 5 of the load circuit.

The threshold semiconductor device is symmetrical in its operation and contains non-rectifying active solid state semiconductor materials and electrodes in non-rectifying contact therewith for controlling the current flow therethrough substantially equally in either or both directions. In their high resistance or blocking conditions these materials may be crystalline like materials or, preferably, materials of the polymeric type including polymeric networks and the like having covalent bonding and cross linking highly resistant to crystallization, which are in a locally organized disordered solid state condition which is generally amorphous (not crystalline) but which may possibly contain relatively small crystals or chains or ring segments which would probably be maintained in randomly oriented position therein by the cross linking. These polymeric structures may be one, two or three dimensional structures. While many different materials may be utilized, for example, these materials can be tellurides, selenides, sulfides or oxides of substantially any metal, or metalloid, or intermetallic compound, or semiconductor or solid solutions or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the solid state semiconductor materials of this device, operate, or have a strong tendency to operate, to inhibit crystallization in the semiconductor materials, and it is believed that this crystallization inhibiting tendency is particularly pronounced where the percentages of the materials are relatively remote from the stoichiometric and eutectic ratios of the materials, and/or where the materials themselves have strong crystal inhibiting characteristics, such as, for example, arsenic, gallium and the like. As a result, where, as here, the semiconductor materials have strong crystallization inhibiting characteristics, they will remain in or revert to their disordered or generally amorphous state.

The following are specific examples of some of the semiconductor materials which have given satisfactory results in a threshold semiconductor device (the percentages being by weight):

25% arsenic and 75% of a mixture 90% tellurium and 10% germanium; also, with the addition of 5% silicon;
75% tellurium and 25% arsenic;
71.8% tellurium, 14.05% arsenic, 13.06% gallium and the remainder lead sulfide;
72.6% tellurium, 14.2% arsenic and 13.2% gallium;
72.6% tellurium, 27.4% gallium arsenide;
85% tellurium, 12% germanium and 3% silicon;
50% tellurium; 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic;
50% aluminum telluride and 50% indium telluride; and
50% aluminum telluride and 50% gallium telluride;
50% tellurium, and 50% aluminum.

In forming the solid state semiconductor materials of this invention, the materials may be ground in an unglazed porcelain mortar to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form the bodies 10, or the molten materials may be cast from the tube into preheated graphite molds to form the bodies. The initial grinding of the materials may be done in the presence of air or in the absence of air, the former being preferable where considerable oxides are desired in the ultimate bodies 10. Alternatively, in forming the bodies 10 it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies 10 formed in the foregoing manner, that the bodies are in a disordered or generally amorphous solid state, the high resistance or blocking state or condition. In such instances, bare electrodes can be and have been embedded in the bodies during the formation thereof, and can be and have been applied to the surfaces thereof, to provide threshold semiconductor devices of this invention wherein the control of the electric current is accomplished in the bulk of the solid state semiconductor materials.

In other instances, it has been found that the bodies 10 formed in the foregoing manner are in a crystalline like solid state, which may be low resistance or conducting state or condition, probably due to the slow cooling of the semiconductor materials during the formation of the bodies. In these instances, it is necessary to change the bodies or portions thereof or the surfaces thereof to a disordered or generally amorphous state, and this may be accomplished in various ways, as for example: Utilizing impure materials, adding impurities; including oxides in the bulk and/or in the surfaces or interfaces; mechanically by machining, sand blasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickle, iron or manganese inclusions, or ionic composition inclusions comprising alkali or alkaline earth metal compositions; electrically by electrical pulsing; or combinations thereof.

Where the entire bodies are changed in any of the foregoing manners to their disordered or generally amorphous solid state, bare electrodes may be embedded therein during the formation of the bodies and the current control by such solid state current controlling devices would be in the bulk. Another manner of obtaining current control in the bulk is to embed in the bodies electrodes which, except for their tips, are provided with electrical insulation, such as an oxide of the electrode material. Current pulses are then applied to the electrodes to cause the effective semiconductor material between the uninsulated tips of the electrodes to assume the disordered or generally amorphous solid state.

The control of current by the threshold semiconductor devices of this invention can also be accomplished by surfaces or films of the semiconductor materials, particularly good results being here obtained. Here, the bodies of the semiconductor material, which are in a low resistance crystalline like solid state, may have their surfaces treated in the foregoing manners to provide surfaces or films which are in their disordered or generally amorphous solid state. Electrodes are suitably applied to the surfaces or films of such treated bodies, and since the bulk of the bodies is in the crystalline like solid state and the surfaces or films are in the disorganized or generally amorphous state (high resistance or substantially an insulator), the control of the current between the electrodes is mainly accomplished by the surfaces or films.

Instead of forming the complete body 10, the foregoing solid state semiconductor materials may be coated on a suitable smooth substrate, which may be a conductor or an insulator as by vacuum deposition or the like, to provide surfaces or films of the semiconductor material on the substrate which surfaces or films are in a highly disordered or generally amorphous solid state (high resistance or substantially an insulator). The solid state semiconductor materials normally assume this state probably because of rapid cooling of the materials as they are deposited or they may be readily made to assume such state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator, the control of the current is along the surfaces or films between the electrodes. A particularly satisfactory device which is extremely accurate and repeatable in production has been produced by vapor depositing on a smooth substrate a thin film of tellurium, arsenic and germanium and by applying tungsten electrodes to the deposited film. The film may be formed by depositing these materials at the same time to provide a uniform and fixed film, or the film may be formed by depositing in sequence layers of tellurium, arsenic, germanium, arsenic and tellurium, and in the latter case, the depositioned layers are then heated to a temperature below the sublimation point of the arsenic to unify and fix the film. The thickness of the surfaces or films, whether formed on the bodies by suitable treatment thereof or by deposition on substrates may be in a range up to a thickness of a few ten thousands of an inch or even up to a thickness of a few hundredths of an inch or more.

The electrodes which are utilized in the threshold semiconductor devices used in this invention may be substantially any good electrical conductor, preferably high melting point materials, such as tantalum, graphite, niobium, tungsten and molybdenum. These electrodes are usually relatively inert with respect to the various aforementioned semiconductor materials.

The electrodes when not embedded in the bodies 10 in the instances discussed above, may be applied to the surfaces or films of bodies, or to the surfaces or films deposited on the substrates in any desired manner, as by mechanically pressing them in place, by fusing them in place, by soldering them in place, by vapor deposition or the like. Preferably, after the electrodes are applied, a pulse of voltage and current is applied to devices for conditioning and fixing the electrical contact between the electrodes and the semiconductor materials. The current controlling devices may be encapsulated if desired.

It is believed that the generally amorphous polymeric like semiconductor materials have substantial current carrier restraining centers and a relatively large energy gap, that they have a relatively small mean free path for the current carriers, large spacial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers, and have a relatively large mean free path for the current carriers due to the crystal lattice structure and hence a relatively high current carrier mobility but that there are relatively few free current carriers due to the substantial current carrier restraining centers therein, a relatively large energy gap therein, and large spatial potential fluctuations therein for providing the high resistance or blocking state or condition. It is further believed that the amorphous type semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than the crystalline type of semiconductor materials, and thus be more suitable for many applications of this invention. By appropriate selection of materials and dimensions, the high resistance values may be predetermined and they may be made to run into millions of ohms, if desired.

As an electrical field is applied to the semiconductor materials (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increases to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" time for switching from the blocking state to the conducting state are extremely short, less than a few microseconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above, a relatively large mean free path for the current carriers can be present in the crystalline structure.

The thermal breakdown may be due to Joule heating of said at least portions or paths of the semiconductor material by the applied electrical field of voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping or orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the current carriers being excited to higher energy states populate bands of lower effective mass and, hence, higher mobility than at lower temperatures and electric field strengths. The possibility for tunneling increased with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers presented could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, mutiplied and conducted in avalanche fashion under the influence of the applied electrical field or voltage to provide and maintain a low resistance or conducting state or condition.

The voltage across the device in its low resistance or conducting state or condition remains substantially constant although the current may increase and decrease greatly. In this connection, it is believed that the conducting filaments or threads or paths between the electrodes increase and decrease in cross section as the current increases and decreases for providing the substantially constant voltage condition while conducting. When the current through said at least portions or paths of the semiconducttor material decreases to a minimum current holding value which is near zero, it is believed that there is insufficient current to maintain the same in their low resistance or conducting state or condition, whereupon they substantially instantaneously change to revert to their high resistance or blocking state or condition. In other words, the conducting filaments or threads or paths between the electrodes are interrupted when this condition occurs. The decrease in current below the minimum current holding value may be brought about by decreasing the applied voltage to a low value. Said at least portions or paths of the semiconductor material may again be substantialily instantaneously changed to their low resistance or conducting state or condition where they are again activated by the voltage applied thereto. The ratio of the blocking resistance to the resistance in the conducting state or condition is extremely high, as for example, larger than 100,000:1. In its low resistance or conducting state or condition the resistance may be as low as 1 ohm or less as determined by the small voltage drop thereacross and the holding current for the device may be near zero.

The voltage-current characteristics of the current controlling device are reversible and are generally independent of the load resistance and independent of whether D.C. or A.C. is used. The manner in which the current controlling device operates in a load circuit powered by an A.C. voltage (FIG. 1) is illustrated by the diagram of FIG. 3 and by the voltage-current curves of FIGS. 4 and 4A. When the device 2 is in its high resistance or blocking state or condition and the peak value of the applied A.C. voltage is less than the upper threshold or breakdown voltage value of the device, the device remains in its high resistance or blocking state or condition as indicated in FIGS. 3 and 4. When the peak value of the A.C. applied voltage is raised to the breakdown or upper threshold voltage level L1 shown in FIG. 3, the device fires and causes said at least portions or paths of the semiconductor material to switch or change to the low resistance or conducting state or condition as indicated in FIGS. 3 and 4A. It is noted that the vertical portions of the curve in FIG. 4A are slightly off-set from the zero voltage center point which curve portions represent the small resistance of the device 2 and the small and substantially constant voltage drop thereacross in its low resistance or conducting state or condition. In this condition there is a constant ratio of voltage change to current change in the device 2, the voltage drop thereacross is a minor fraction of the voltage drop across the active semiconductive material of the device in the blocking condition thereof and a low voltage drop thereacross in the conducting condition of the device is the same for increase and decrease in the instantaneous current above the minimum current holding value. It is also noted in FIG. 4A that the device intermittently assumes its high resistance or blocking state or condition each half cycle of the A.C. voltage as the instantaneous voltage nears zero and drops the current below the minimum current holding value, the current being momentarily interrupted during each half cycle. However, following each momentary half cycle interruption of the current flow, the low resistance state or condition of said at least portions or paths of the semiconductor material resumes the next half cycle when the instantaneous value of the applied voltage reaches a certain level L2 in FIG. 3 which is at times substantially below the upper threshold voltage level, especially where the active semiconductor material has any appreciable thickness where heat dissipation is less than ideal. However, other factors than temperature could also possibly be responsible for the presence of a lower threshold voltage level. The semiconductor device is considered to be in its conducting state or condition despite its momentary return to the high resistance state or condition each half cycle. However, when the peak value of the A.C. voltage is decreased below the lower threshold voltage level L2, the low resistance state or condition does not resume each half cycle and the device is then considered to be in a blocking state or condition, this being illustrated in FIGS. 3 and 4. After the device becomes non-conducting, it cannot again become conducting until the peak voltage of the applied A.C. voltage becomes at least as great as the upper threshold voltage level L1 of the device to produce the voltage-current curve of FIG. 4A.

FIGS. 2, 2A and 2B illustrate some exemplary physical forms of the threshold semiconductor device 2. They comprise an inactive and conducting body portion 10a of metal or the like or an inactive semiconductor material and one or more active semiconductor layers or films 10b–10b' made in the manner described above. The electrodes 12 and 12' may comprise separate layers of metal or the like as illustrated in the embodiments of FIGS. 2A and 2B or one of the electrodes 12 may be formed by the conductive body portion 10a as illustrated in the embodiment of FIG. 2.

Refer once again to FIG. 5 which illustrates the application of the threshold semiconductor device 2 just described as a transient suppressor. As there shown, the electrodes 12–12' of the threshold semiconductor device 2 are connected across an inductive load device 14 which is coupled by supply lines 22—22 and through switch contacts 18 to the main source of voltage 19 for the load circuit which may be A.C. or D.C. It is assumed that the voltage in the circuit is such that the peak value of the output of the source of voltage 19 is lower than the upper threshold level of the threshold semiconductor device 2 and also most advantageously lower than the lower threshold level thereof, although this is not necessary for all applications of the invention.

Figure 6:
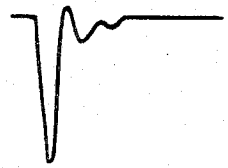
FIGS. 6 and 7 show oscilliscope traces of the voltage transient across the inductive load in FIG. 5 respectively without and with the threshold semiconductor device connected across the inductive load.
Figure 7:

The upper threshold level of the threshold semiconductor device 2 is assumed to be within a safe voltage range which will not cause serious arcing of the switch contacts 18 or damage to the load 14. Accordingly, when the switch 18 is opened, any transients which may develop in the inductive load 14 reaching the upper threshold level of the device will drive the device into its conducting state or condition. Conduction of the device will dissipate or suppress the transient. FIG. 7 shows the suppression effect of the threshold semiconductor device 2 in comparison to the transient shown in FIG. 6 which would be developed in the absence of the device. Upon suppression of the transient, the threshold semiconductor device 2 will revert and be maintained in its blocking state or condition since, in the particular example being discussed, the switch contacts 18 are assumed to remain open as to disconnect the source of voltage 19 from the load circuit. However, even if the switch were to remain closed before the threshold semiconductor device finally reverts to its blocking state or condition, the device would nevertheless revert to its blocking state or condition since, in the preferred circuit being discussed, the maximum value of the output of the source of voltage 19 is below the lower threshold level. This would be an important requirement of a circuit where dangerous transients may be induced or otherwise form on the supply lines 22—22, in the absence of the opening of the switch contacts 18.

One of the most significant features about the threshold semiconductor device 2 is that it has an exceedingly high leakage resistance, for example, in the order from 1 to 10 megohms and higher, so that very little power is consumed by the device during the normal non-conductive state or condition thereof, and it does not materially affect the impedance of the load circuit. In addition, as previously indicated, the device can be made at an exceedingly low cost.

Figure 9:
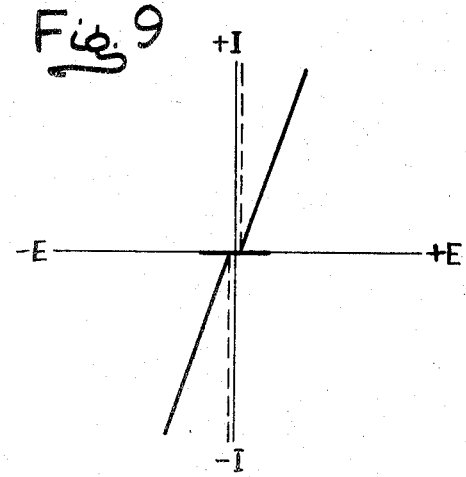
FIG. 9 illustrates the modified voltage-current characteristics of the transient suppressor circuit of FIG. 8 during the conductive state of the threshold semiconductor device.
Figure 8:
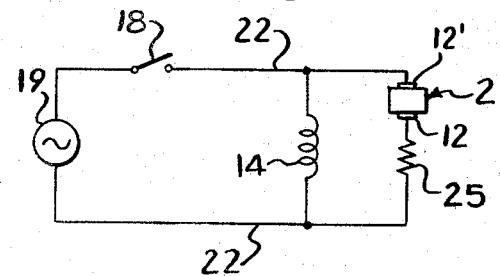
FIG. 8 shows a modified suppressor circuit arrangement utilizing the threshold semiconductor device in FIG. 1 as a transient suppressor for an inductive load.

Refer now to the modified suppressor circuit of FIG. 9 wherein a resistor 25 is placed in series with the threshold semiconductor device 2. As previously indicated, normally the voltage-current characteristic of the device during conduction thereof is a constant voltage variable current characteristic (FIG. 4A). Considering the suppressor circuit as including the threshold semiconductor device 2 and the resistor 25, the overall voltage-current characteristic of this circuit can be modified so as to have a linear slope as indicated by the inclined lines in FIG. 9. The resistor 25 thus controls the rate at which the transient energy is absorbed and therefore its value can be specified to optimize a particular circuit design. The greater the value of the resistor 25 the sooner will the transient energy be dissipated. If the conductive load 14 were to be a coil of a relay, the speed of dissipation of the transient would be important where the drop-out time of the relay is a factor to be considered.

I claim:

1. In a circuit including a load, a source of voltage for supplying the load with current, means including a pair of conductors for connecting the source of voltage to said load and across which a transient voltage of any polarity may appear which can reach at least a minimum unsafe level substantially greater than the maximum value of the output of said source of voltage, the improvement comprising transient voltage suppression means connected across said pair of conductors, said transient voltage suppression means comprising a symmetrical bi-directional semiconductor current controlling device including semiconductor material means and two load terminals in non-rectifying contact therewith and coupled across said conductors, said semiconductor material means being of one conducting type and including means for providing a first condition of relatively high resistance for substantially blocking current substantially equally in either direction therethrough between the load terminals, said semiconductor material means including means responsive to voltage of at least an upper threshold value in excess of said maximum value of the output of said source of voltage and less than said minimum unsafe voltage level applied to said load terminals for altering said first condition of relatively high resistance of said semiconductor material means for substantially instantaneously providing at least one path through said semiconductor material means between the load terminals having a second condition of relatively low resistance for conducting the current therethrough substantially equally in each direction therethrough to suppress said transient voltage, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in both directions which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value occurring when the transient current diminishes below said value for immediately causing realtering of said second relatively low resistance conducting condition of said at least one path to said first relatively high resistance blocking condition for substantially blocking the current therethrough substantially equally in both directions therethrough.

2. In a circuit including a load, a source of voltage for supplying the load with current, means including a pair of conductors for connecting the source of voltage to said load and across which a transient voltage of any polarity may appear which can reach at least a minimum unsafe level substantially greater than the maximum value of the output of said source of voltage, the improvement comprising transient voltage suppression means connected across said pair of conductors, said transient voltage suppression means comprising a symmetrical bi-directional semiconductor current controlling device including semiconductor material means and two load terminals in non-rectifying contact therewith and coupled across said conductors, said semiconductors material means being of one conducting type and including means for providing a first condition of relatively high resistance for substantially blocking current substantially equally in either direction therethrough, said semiconductor material means including means responsive to voltage of at least an upper threshold value applied to said local terminals for altering said first condition of relatively high resistance of said semiconductor material means for substantially instantaneously providing at least one path through said semiconductor material means between the load terminals having a second condition of relatively low resistance for conducting current therethrough substantially equally in either direction therethrough to suppress said transient voltage, said second low resistance condition lasting until the instantaneous current flow therethrough goes below a minimum instantaneous current holding value due to the substantial disappearance of the applied voltage across said load terminals, and, if the applied voltage thereto then increases immediately to a higher value above a lower threshold value, said second low resistance condition resuming when the instantaneous value of the voltage across said load terminals reaches a lower threshold value, said upper and lower threshold values both being in excess of the peak value of the output of said source of voltage and below said minimum unsafe voltage level, said semiconductor material means including means for maintaining said at least one path of said semiconductor material means in its said second relatively low resistance conducting condition until said disappearance of the applied voltage and providing a substantially constant ratio of voltage change to current change for conducting current in either direction therethrough at a substantially constant voltage therethrough between the load terminals which voltage is the same for increase and decrease in the instantaneous current above said minimum instantaneous current holding value, and providing a voltage drop across said at least one path in its said second relatively low resistance conducting condition which is a minor fraction of the voltage drop across said semiconductor material means in its said first relatively high resistance blocking condition near said upper threshold voltage.

3. In a circuit including an inductive load, a source of voltage for supplying the load with current, switch means between the source of voltage and the load for connecting and disconnecting the source of voltage respectively to and from the load, disconnection of the source of voltage from the load resulting in a transient voltage buildup across the inductive load of at least a minimum unsafe voltage level substantially greater than the maximum value of the output of said source of voltage, the improvement comprising a transient voltage suppression means connected across said inductive load, said transient voltage suppression means comprising a symmetrical bi-directional semiconductor current controlling device including semiconductor material means and two load terminals in non-rectifying contact therewith and coupled across said inductive load, said semiconductor material means being of one conducting type and including means for providing a first condition of relatively high resistance for substantially blocking current substantially equally in either direction therethrough between the load terminals, said semiconductor material means including means responsive to voltage of at least an upper threshold value in excess of said maximum value of the output of said source of voltage and less than said minimum unsafe voltage level applied to said load terminals for altering said first condition of relatively high resistance of said semiconductor material means for substantially instantaneously providing at least one path through said semiconductor material means between the load terminals having a second condition of relatively low resistance for conducting the current therethrough substantially equally in each direction therethrough to support said transient voltage, said semiconductor material means including means for maintaining said at least one path of said semiconductor material means in its said second relatively low resistance conducting condition providing a substantially constant ratio of voltage change to current change for conducting current at a substantially constant voltage therethrough between the load terminals substantially equally in both directions which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current value occurring when the transient current diminishes below said holding value for immediately causing realtering of said second relatively low resistance conducting condition of said at least one path to said first relatively high resistance blocking condition for substantially blocking the current therethrough substantially equally in both directions therethrough.

4. In a circuit including an inductive load, a source of voltage for supplying the load with current, means including a pair of conductors for connecting the source of voltage to said load and across which a transient voltage of any polarity may appear which reaches at least an unsafe minimum level substantially greater than the maximum value of the output of said source of voltage, the improvement comprising transient voltage suppression means connected across said pair of conductors, said transient voltage suppression means comprising a series connected resistor a symmetrical bi-directional semiconductor current controlling device including semiconductor material means and two load terminals in non-rectifying contact therewith and connected through said resistor across said conductors, said semiconductor material means being of one conducting type and including means for providing a first condition of relatively high resistance for substantially blocking current substantially equally in either direction therethrough between the load terminals, said semiconductor material means including means responsive to voltage of at least an upper threshold value in excess of said maximum value of the output of said source of voltage and less than said minimum unsafe voltage level applied to said load terminals for altering said first condition of relatively high resistance of said semiconductor material means for substantially instantaneously providing at least one path through said semiconductor material means between the load terminals having a second condition of relatively low resistance for conducting the current therethrough substantially equally in each direction therethrough to suppress said transient voltage, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in both directions which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value occurring when the transient current diminishes below said value for immediately causing realtering of said second relatively low resistance conducting condition of said at least one path to said first relatively high resistance blocking condition for substantially blocking the current therethrough substantially equally in both directions therethrough, and said bi-directional semiconductor device and said resistor together forming a transient suppression circuit which provides a voltage current characteristic across the transient-voltage suppression means which slopes substantially so the voltage thereacross varies appreciably with current flow therethrough.

5. In a circuit including a load, a source of A.C. voltage for supplying the load with current, means including a pair of conductors for connecting the source of A.C. voltage to said load and across which a transient voltage of any polarity may appear which can reach at least a minimum unsafe level substantially greater than the maximum value of the peak value of the output of said source of A.C. voltage, the improvement comprising transient voltage suppression means connected across said pair of conductors, said voltage suppression means comprising a semiconductor material means and electrodes in non-rectifying contact therewith for connecting the same across said conductor, said semiconductor material means being of one conducting type, said semiconductor material means including means for providing a first condition of relatively high resistance for substantially blocking the alternating current therethrough between the electrodes substantially equally in both phases of the alternating current, said semiconductor material means including means responsive to an alternating current voltage of at least a threshold value above the peak value of the output of said source of A.C. voltage and below said minimum unsafe level applied to said electrodes for altering said first condition of relatively high resistance of said semiconductor material means for substantially instantaneously providing at least one path through said semiconductor material means between the electrodes having a second condition of relatively low resistance for conducting the alternating current therethrough substantially equally in each phase of the alternating current to suppress said transient voltage, said semiconductor material means including means for maintaining said at least one path of said semiconductor material means in its said second relatively low resistance conducting condition for conducting current between the electrodes substantially equally in each phase of the alternating current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each phase of the alternating current for immediately causing realtering of said second relatively low resistance conducting condition of said at least one path to said first relatively high resistance blocking condition in each phase of the alternating current for substantially blocking the alternating current therethrough substantially equally in each phase of the alternating current.

References Cited

UNITED STATES PATENTS

| 2,789,254 | 4/1957 | Bodle | 307—88.5 |
| 2,937,963 | 5/1960 | Pelfrey | 317—234 |
| 3,086,160 | 4/1963 | Loftus | 317—234 |
| 3,093,755 | 6/1963 | Haberecht | 317—234 |
| 3,102,226 | 8/1963 | Borkovitz | 323—23 |
| 3,196,329 | 7/1965 | Cook | 317—235 |
| 3,263,092 | 7/1966 | Knauss | 307—88.5 |
| 3,271,591 | 5/1967 | Ovshinsky | 307—88.5 X |

ORIS L. RADER, *Primary Examiner.*

T. J. MADDEN, *Assistant Examiner.*